United States Patent
Nakai et al.

(10) Patent No.: US 9,321,646 B2
(45) Date of Patent: Apr. 26, 2016

(54) HYDROGEN SULFIDE GAS PRODUCTION PLANT SYSTEM AND METHOD FOR RECOVERING AND USING HYDROGEN SULFIDE GAS

(71) Applicant: SUMITOMO METAL MINING CO., LTD., Tokyo (JP)

(72) Inventors: Osamu Nakai, Tokyo (JP); Satoshi Matsubara, Tokyo (JP); Tomoyuki Hirose, Tokyo (JP); Kouichi Nakagawa, Tokyo (JP); Masafumi Nakamura, Tokyo (JP)

(73) Assignee: SUMITOMO METAL MINING CO., LTD., Tokyo (JP)

( * ) Notice: Subject to any disclaimer, the term of this patent is extended or adjusted under 35 U.S.C. 154(b) by 0 days.

(21) Appl. No.: 14/416,428

(22) PCT Filed: Jul. 8, 2013

(86) PCT No.: PCT/JP2013/068614
§ 371 (c)(1),
(2) Date: Jan. 22, 2015

(87) PCT Pub. No.: WO2014/021062
PCT Pub. Date: Feb. 6, 2014

(65) Prior Publication Data
US 2015/0175420 A1    Jun. 25, 2015

(30) Foreign Application Priority Data

Jul. 31, 2012   (JP) .................. 2012-170329

(51) Int. Cl.
*C01B 17/16*    (2006.01)
*B01J 19/00*    (2006.01)
*B01J 19/24*    (2006.01)

(52) U.S. Cl.
CPC ........... *C01B 17/162* (2013.01); *B01J 19/2445* (2013.01); *C01B 17/16* (2013.01); *B01J 2219/00006* (2013.01); *B01J 2219/00038* (2013.01); *Y10T 137/0324* (2015.04)

(58) Field of Classification Search
CPC .... C01B 17/16; C01B 17/161; B01J 19/0006; B01J 19/0046
See application file for complete search history.

(56) References Cited

U.S. PATENT DOCUMENTS

| 4,210,627 A | 7/1980 | Verloop et al. |
| 5,173,285 A | 12/1992 | Takenaka et al. |

(Continued)

FOREIGN PATENT DOCUMENTS

| EP | 2 199 257 A2 | 6/2010 |
| JP | S5397995 A | 8/1978 |

(Continued)

OTHER PUBLICATIONS

Aug. 27, 2013 International Search Report issued in International Application No. PCT/JP2013/068614.

(Continued)

*Primary Examiner* — Timothy Vanoy
(74) *Attorney, Agent, or Firm* — Oliff PLC

(57) ABSTRACT

The present invention allows low-concentration hydrogen sulfide gas to be recovered and supplied to a processing plant that uses hydrogen sulfide gas. The hydrogen sulfide gas production plant is provided with a first supply pipe that supplies hydrogen sulfide gas obtained from a sulfur recovery facility to a processing plant, and a second supply pipe that is branched at a predetermined point in the first supply pipe and supplies the hydrogen sulfide gas from the sulfur recovery facility to the processing plant. The first supply pipe has a concentration meter that is provided on the upstream side than the branch point and measures the concentration of the hydrogen sulfide gas. The first supply pipe and the second supply pipe have ON/OFF valves that are provided on the downstream side of the branch point and perform ON/OFF control of the supply to the processing plant through the supply pipe.

8 Claims, 4 Drawing Sheets

(56) References Cited

U.S. PATENT DOCUMENTS

| | | | | |
|---|---|---|---|---|
| 7,537,739 B2* | 5/2009 | Haas | ................... | B01J 19/0006 422/127 |
| 2009/0317322 A1 | 12/2009 | Wolfert et al. | | |
| 2010/0310439 A1 | 12/2010 | Brok et al. | | |
| 2016/0002038 A1* | 1/2016 | Nakai | ..................... | C01B 17/16 423/563 |

FOREIGN PATENT DOCUMENTS

| | | |
|---|---|---|
| JP | H01257109 A | 10/1989 |
| JP | H0255210 A | 2/1990 |
| JP | H05212236 A | 8/1993 |
| JP | H09286861 A | 11/1997 |
| JP | H10265204 A | 10/1998 |
| JP | 2009173983 A | 8/2009 |
| JP | 2010515658 A | 5/2010 |
| JP | 2010126778 A | 6/2010 |
| JP | 2010536573 A | 12/2010 |
| WO | 2011/129395 A1 | 10/2011 |

OTHER PUBLICATIONS

Feb. 16, 2016 Extended European Search Report issued in European Application No. 13825169.9.

* cited by examiner

HYDROGEN SULFIDE GAS PRODUCTION PLANT SYSTEM AND METHOD FOR RECOVERING AND USING HYDROGEN SULFIDE GAS

FIELD OF THE INVENTION

The present invention relates to a hydrogen sulfide gas production plant and a method for recovering and using waste hydrogen sulfide gas. It more specifically relates to a hydrogen sulfide gas production plant capable of recovering discharged waste hydrogen sulfide gas and supplying the same to a processing plant that uses hydrogen sulfide gas, and also to a method for recovering and using waste hydrogen sulfide gas using the hydrogen sulfide gas production plant.

The present application asserts priority rights based on JP Patent Application 2012-170329 filed in Japan on Jul. 31, 2012. The total contents of disclosure of the patent application of the senior filing date are to be incorporated by reference into the present application.

BACKGROUND OF THE INVENTION

In a hydrometallurgical method for a nickel oxide ore, for example, a solution obtained by neutralizing a leachate of a nickel oxide ore or a solution for nickel recovery from which impurities have been removed is sulfurized by blowing hydrogen sulfide gas thereto to form a metal sulfide.

The hydrogen sulfide gas used at this time is produced in a hydrogen sulfide gas production plant configured as shown in FIG. 3 or FIG. 4, for example.

Specifically, the hydrogen sulfide gas production plant 50 shown in FIG. 3 includes a reaction facility 51 that generates hydrogen sulfide gas from supplied sulfur and hydrogen gas, a cooling facility 52 that cools the hydrogen sulfide gas, a cleaning facility 53 that cleans sulfur contained in the hydrogen sulfide gas, and a drying facility 54 that dries the cleaned hydrogen sulfide gas to remove moisture. In addition, the hydrogen sulfide gas production plant 50 is provided with, as incidental facilities, a storage facility 55 that stores the generated hydrogen sulfide gas and a supply facility 56 that supplies the hydrogen sulfide gas.

In the hydrogen sulfide gas production plant 50, a catalyst is used in the reactor 51 for the purpose of reducing the activation energy. In addition, in the hydrogen sulfide gas production plant 50, after sulfur contained in the produced hydrogen sulfide gas is removed in the cleaning facility 53, moisture is removed in the drying facility 54, thereby preventing the corrosion of the facilities due to moisture.

In addition, in the hydrogen sulfide gas production plant 50, the produced hydrogen sulfide gas is compressed to a necessary pressure using the supply facility 56, such as a compressor, and the compressed hydrogen sulfide gas is supplied to a plant that uses hydrogen sulfide gas in the dezincification process, the sulfurization process, or the like in the hydrometallurgical method for a nickel oxide ore mentioned above, for example.

In the hydrogen sulfide gas production plant 50, as conditions for the production of hydrogen sulfide gas, for example, the plant is operated at a pressure of about 5 kPaG and a temperature of about 380° C. In this hydrogen sulfide gas production plant 50, a catalyst is used in the reaction facility 51. Therefore, the plant can be operated at low-pressure and low-temperature conditions, and this has been an advantage in operation.

However, in the hydrogen sulfide gas production plant 50, it is necessary to regularly exchange the catalyst in the reaction facility 51. In addition, considering the catalyst life, it is necessary to strictly control the quality of sulfur, which is a raw material for hydrogen sulfide gas.

Meanwhile, the hydrogen sulfide gas production plant 60 shown in FIG. 4 is a plant that does not use a catalyst in a reactor. As shown in FIG. 4, the hydrogen sulfide gas production plant 60 includes a reaction facility (a reactor 66, a quench tower 67, a heater 68) 61 that generates hydrogen sulfide gas from sulfur and hydrogen gas, cooling facilities 62 (62A, 62B) that cool the hydrogen sulfide gas, a knockout facility 63 that removes sulfur in the hydrogen sulfide gas and supplies the hydrogen sulfide gas, and a blowdown facility 64 that recovers the sulfur removed from the hydrogen sulfide gas and supplies the same to a sulfur processing plant or the like. In addition, the hydrogen sulfide gas production plant 60 is provided with, as an incidental facility, a facility 65 that cools the temperature of sulfur to adjust the heat balance.

In the hydrogen sulfide gas production plant 60, molten sulfur is stored in the reactor 66 of the reaction facility 61, and hydrogen gas is supplied from the lower part. Accordingly, while the hydrogen gas passes through the molten sulfur, a hydrogen sulfide gas generation reaction proceeds. Incidentally, sulfur, which decreases due to the reaction, is supplied from the upper part of the reaction facility 61. The hydrogen sulfide gas generated in the reaction facility 61 is mostly hydrogen sulfide, but contains sulfur steam involved when the hydrogen gas passed through the reactor.

In addition, as the conditions for the production of hydrogen sulfide gas, the hydrogen sulfide gas production plant 60 is operated under high-temperature and high-pressure conditions such as, for example, a pressure of about 800 kPaG and a temperature of about 470° C. The temperature of the generated hydrogen sulfide gas is reduced to about 150° C. when discharged from the quench tower 67 forming the reaction facility 61. The hydrogen sulfide gas is further cooled in the cooling facility 62 to about 50° C. (temperature for use in the facility of the supply destination) and then transferred to the knockout facility 63.

In addition, most of sulfur contained in the hydrogen sulfide gas generated in the reaction facility 61 causes serious problems in operation when it adheres to valves, such as a control valve and a manual valve, or meters, such as a thermometer and a pressure meter, in a plant that uses hydrogen sulfide gas, for example, which is the supply destination. Therefore, sulfur is once solidified in the knockout facility 63, and the sulfur accumulated at the bottom is heated by steam through a jacket installed on the lower outer periphery of the knockout facility 63, thus melted, and recovered. The recovered sulfur is stored in the blowdown facility 64, then supplied to a sulfur processing plant using a supply pump 69, and thus processed or repeatedly used.

In this way, sulfur contained in the hydrogen sulfide gas generated in the hydrogen sulfide gas production plant 60 is separated by a knockout drum, and the hydrogen sulfide gas is then supplied to a plant that uses hydrogen sulfide gas in the dezincification process, the sulfurization process, or the like in the hydrometallurgical method for a nickel oxide ore mentioned above, for example.

In the hydrogen sulfide gas production plant 60, the operation control is performed in the state where the pressure in the system is high. Accordingly, facilities such as a compressor and a chiller facility are not necessary, whereby the initial investment can be held down. Further, unlike the hydrogen sulfide gas production plant 50 mentioned above, the regular catalyst exchange, the exchange cost therefor, and the cost of maintenance including sulfur quality control are unnecessary, leading to an advantage in that the operation cost can be reduced.

However, because the hydrogen sulfide gas production plant 60 is operated under high-pressure and high-temperature conditions, when the produced hydrogen sulfide gas is to be supplied, it is necessary to reduce the pressure to a pressure suitable for the operation of the plant of the supply destination. For example, in a plant for the sulfurization process in which a nickel oxide ore is processed to form a mixed sulfide containing nickel and cobalt (mixed sulfide: MS), the plant is operated with the pressure of hydrogen sulfide gas being about 350 kPaG. In addition, in a plant for the dezincification process in which sulfurization is performed to convert zinc contained in the neutralization end solution into zinc sulfide, the plant is operated with the pressure of hydrogen sulfide gas being about 5 kPaG or less. In addition, in the hydrogen sulfide gas production plant 60, because the plant is operated under high-pressure and high-temperature conditions, the risk in case of gas leakage is high, and there is an increased load on the hydrogen sulfide gas cooling facility 62, which is a facility that cools sulfur (sulfur steam) contained in the hydrogen sulfide gas, or the knockout facility 63, which is a facility that recovers the hydrogen sulfide gas.

In addition, in the hydrogen sulfide gas production plant 60, although sulfur contained in the generated hydrogen sulfide gas is recovered and removed in the knockout facility 63, some of the sulfur solidifies in the cooling facility 62 and adheres to the inside, which reduces the operation efficiency when allowed to stand as it is. Therefore, a plurality of cooling facilities are provided, and they are switched and used alternately.

Specifically, for example, two systems of cooling facilities 62A, 62B are provided, and, with a decrease in the cooling capacity due to sulfur adhering to the inside, the cooling facility 62A in use (facility having adhesion inside) is switched with the standby cooling facility 62B (facility with the adhesion inside being removed). Then, with respect to the cooling facility 62 whose cooling capacity has decreased, the sulfur adhering in the facility is melted using steam and recovered, thereby making it standby. By repeating these operations, the hydrogen sulfide gas production plant 60 is prevented from a decrease in the operation rate. Incidentally, the sulfur melted and recovered in the cooling facility 62 (62A, 62B) is transferred to the blowdown facility 64 and processed in the same manner.

Incidentally, in the hydrogen sulfide gas production plant 60, the hydrogen sulfide gas production facilities are operated under high-pressure and high-temperature conditions as mentioned above. Accordingly, it is believed that trouble is likely to occur, including problems in each control valve or ON/OFF valve and problems in each meter, as well as leakage of hydrogen sulfide gas from the hydrogen sulfide gas production facility or incidental facilities, pipe clogging due to the adhesion of sulfur contained in hydrogen sulfide gas or the like.

In order to prevent such trouble beforehand, regular inspections on the hydrogen sulfide gas production plant are necessary.

In case of trouble as above or at the time of regular inspection, it is necessary that the hydrogen sulfide gas production plant and the processing plant that uses hydrogen sulfide gas are isolated by an ON/OFF valve or the like, and then the inside of the hydrogen sulfide gas production plant is replaced with nitrogen gas. In addition, also in the case where a problem occurs in the processing plant that uses hydrogen sulfide gas, it is necessary that the hydrogen sulfide gas production plant and the processing plant that uses hydrogen sulfide gas are isolated by an ON/OFF valve or the like, before dealing with the problem.

Accordingly, in case of trouble or at the time of regular inspection, low-concentration hydrogen sulfide gas will be present in the plant.

Further, when hydrogen sulfide gas is to be produced, it is necessary to replace the hydrogen sulfide gas production facility and its incidental facilities with a nitrogen gas atmosphere in advance of the start-up. Therefore, at the time when the operation has just started and hydrogen sulfide gas has been just generated (produced), the concentration of the hydrogen sulfide gas is low, and it is necessary to take a measure also in the processing plant that uses hydrogen sulfide gas, such as the adjustment of the flow rate.

Usually, such low-concentration hydrogen sulfide gas is a loss as so-called waste hydrogen sulfide gas. Such waste hydrogen sulfide gas is extremely toxic and cannot be discharged into the air as it is. Therefore, the gas has to be processed in a flaring facility (facility that causes combustion to reduce toxicity) or a harm elimination facility using caustic soda or the like, before discharge.

However, in the case of processing in a flaring facility, the hydrogen sulfide gas turns into SOx gas and, though only slightly, affects the environment. Meanwhile, in order to make it harmless by a harm elimination facility, a neutralizing agent such as caustic soda is required. Such a neutralizing agent has to be taken into consideration as operation cost, resulting in a decrease in the efficiency of operation.

Therefore, there has been a demand for a method for recovering and effectively using such low-concentration hydrogen sulfide gas.

For example, Patent Literature 1 proposes, as a method for recovering an excess of hydrogen sulfide gas discharged from a sulfurization reaction tank in the sulfurization (nickel recovery) process in which a nickel oxide ore is processed to produce MS, a method in which the hydrogen sulfide gas is returned to the process through a solution prepared by absorption in caustic soda (in the form of sodium hydrogen sulfide, sodium sulfide or the like), and the sulfur content is used for the sulfurization reaction.

In addition, Patent Literature 2 discloses a method in which hydrogen sulfide gas vaporized during the dehydration process is absorbed by an organic amide solvent and thus recovered out of the system where the dehydration process is performed, and the recovered hydrogen sulfide is reused as a raw material of an alkali metal sulfide for a polymerization reaction.

However, these methods do not recover hydrogen sulfide as gas, and also recovering solvents, such as caustic soda and organic amide, are necessary.

Patent Literature 3 discloses, in a method in which an aqueous sulfuric acid solution containing nickel and cobalt is introduced, and also a gas for sulfurization containing hydrogen sulfide is supplied to the gas phase, thereby producing a sulfide containing nickel and cobalt, a method for maintaining the high yield of nickel and cobalt in the case where the hydrogen sulfide gas concentration in the sulfurization gas supplied into the reaction vessel decreases from 95 to 100% by volume used in the steady state of operation to a lower concentration. Specifically, according to the method, in the case where the hydrogen sulfide gas concentration is 85 to 90% by volume, the input of nickel and cobalt introduced into the reaction vessel is 30 to 35% by mass of the input in the steady state, while in the case where the hydrogen gas concentration is more than 90% by volume, the input of nickel and cobalt introduced into the reaction vessel is reduced to 55 to 60% by mass.

This method makes it possible to effectively use the hydrogen sulfide gas having a lower concentration than in the steady state. However, the method cannot deal with the case where the inside of the hydrogen sulfide gas production plant is replaced with nitrogen, and the hydrogen sulfide gas concentration decreases to less than 85% by volume, for example.

PRIOR ART DOCUMENTS

Patent Documents

PTL 1: Japanese Patent Application Laid-Open No. 2010-126778
PTL 2: Japanese Patent Application Laid-Open No. H09-286861
PTL 3: Japanese Patent Application Laid-Open No. 2009-173983

DISCLOSURE OF THE INVENTION

The present invention has been proposed in such situations and is aimed at providing a hydrogen sulfide gas production plant system that allows low-concentration hydrogen sulfide gas, which is generated at the time of regular inspection on a hydrogen sulfide gas production plant, in case of trouble, or at the time of start-up, to be efficiently recovered and effectively supplied to a plant that uses hydrogen sulfide gas (processing plant); and a method for recovering and using hydrogen sulfide gas using the hydrogen sulfide gas production plant system.

The hydrogen sulfide gas production plant system according to the present invention includes a plurality of systems of hydrogen sulfide gas production plants provided with at least a reaction facility that generates hydrogen sulfide gas from sulfur and hydrogen gas, a plurality of cooling facilities that cool the generated hydrogen sulfide gas, and a sulfur recovery facility that recovers sulfur contained in the hydrogen sulfide gas. The hydrogen sulfide gas production plant system is that: the hydrogen sulfide gas production plant of each system is provided with a first supply pipe that supplies the hydrogen sulfide gas from which sulfur has been recovered in the sulfur recovery facility to a processing plant that uses hydrogen sulfide gas, and a second supply pipe that is branched at a predetermined point in the first supply pipe and supplies the hydrogen sulfide gas from the sulfur recovery facility to the processing plant; the first supply pipe has a concentration meter that is provided on the sulfur recovery facility side of the predetermined branch point and measures the concentration of the hydrogen sulfide gas; and the first supply pipe and the second supply pipe each have an ON/OFF valve that is provided on the processing plant side of the predetermined branch point and turns ON/OFF the supply of the hydrogen sulfide gas to the processing plant through the supply pipe.

In addition, the method for recovering and using hydrogen sulfide gas according to the present invention is a method for recovering and using hydrogen sulfide gas in a hydrogen sulfide gas production plant system that includes a plurality of systems of hydrogen sulfide gas production plants provided with at least a reaction facility that generates hydrogen sulfide gas from sulfur and hydrogen gas, a plurality of cooling facilities that cool the generated hydrogen sulfide gas, and a sulfur recovery facility that recovers sulfur contained in the hydrogen sulfide gas. The method is that: the hydrogen sulfide gas production plant of each system is provided with a first supply pipe that supplies the hydrogen sulfide gas from which sulfur has been recovered in the sulfur recovery facility to a processing plant that uses hydrogen sulfide gas, and a second supply pipe that is branched at a predetermined point in the first supply pipe and supplies the hydrogen sulfide gas from the sulfur recovery facility to the processing plant; the first supply pipe has a concentration meter that is provided on the sulfur recovery facility side of the predetermined branch point and measures the concentration of the hydrogen sulfide gas; the first supply pipe and the second supply pipe each have an ON/OFF valve that is provided on the processing plant side of the predetermined branch point and turns ON/OFF the supply of the hydrogen sulfide gas to the processing plant through the supply pipe; and, when any of the plurality of production plants is suspended from operation, in the case where hydrogen sulfide gas having a lower concentration than in normal times is generated, in the production plant suspended from operation, the hydrogen sulfide gas having a lower concentration is recovered through the second supply pipe and supplied to the processing plant, while in the production plants of other systems, hydrogen sulfide gas produced under an increased production load is supplied to the processing plant through the first supply pipe.

Effects of Invention

According to the present invention, low-concentration hydrogen sulfide gas generated at the time of regular inspection on a hydrogen sulfide gas production plant, in case of trouble, or at the time of start-up can be efficiently recovered and effectively supplied to a plant that uses hydrogen sulfide gas (processing plant).

DETAILED DESCRIPTION OF THE INVENTION

Figure 1:
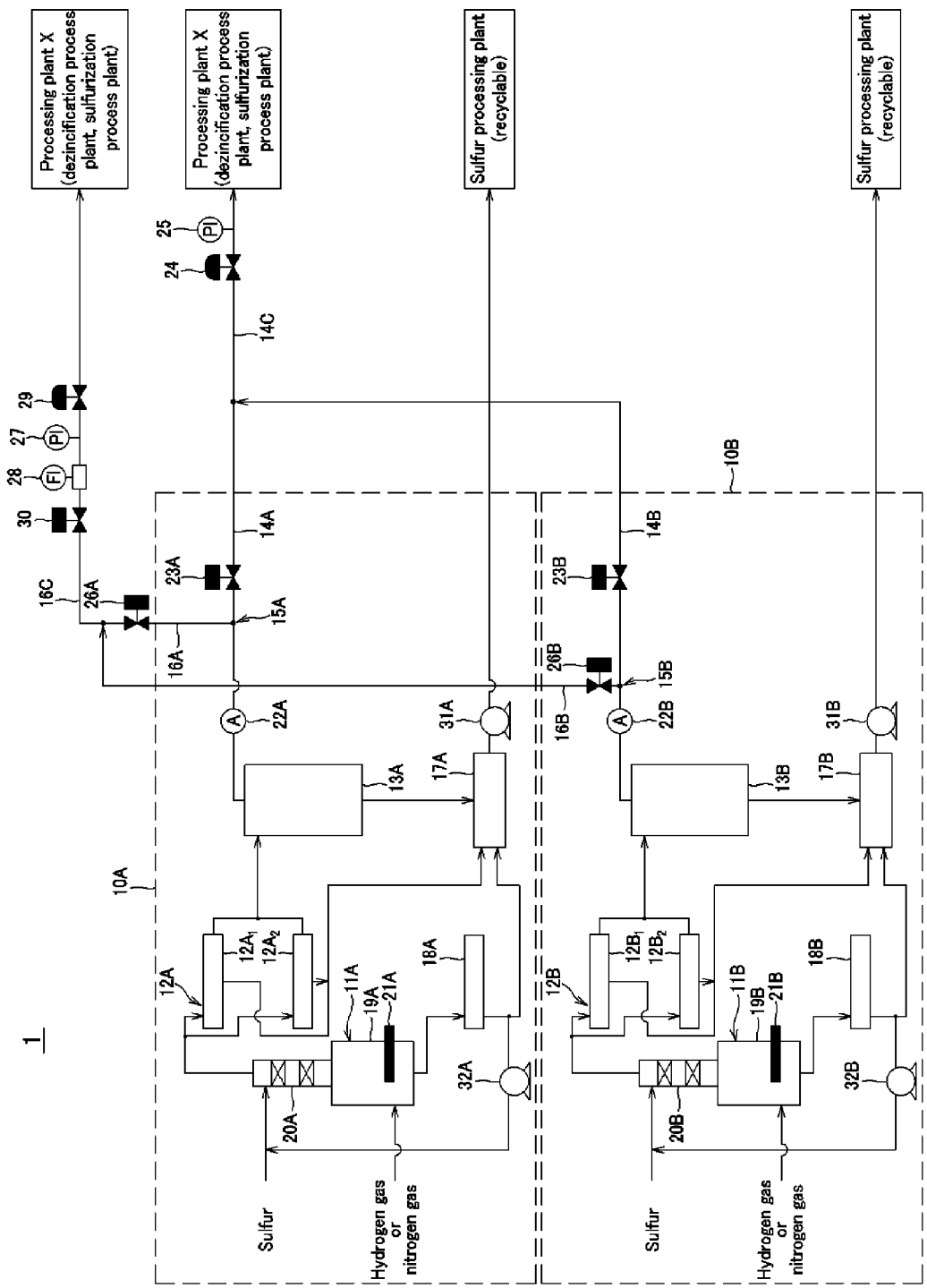
FIG. 1 is a schematic block diagram showing an example of the configuration of a hydrogen sulfide gas production plant system.

Hereinafter, the hydrogen sulfide gas production plant system and the method for recovering and using hydrogen sulfide gas according to the present invention will be described in detail in the following order. Incidentally, the present invention is not limited to the following embodiments, and various modifications can be made without deviating from the gist of the present invention.
1. Summary of the Invention
2. Hydrogen Sulfide Gas Production Plant System
3. Method for Recovering and Using Hydrogen Sulfide Gas
4. Examples
[1. Summary Of The Invention]
The hydrogen sulfide gas production plant system according to the present invention includes a plurality of systems of hydrogen sulfide gas production plants (hereinafter sometimes simply referred to as "production plants") provided with at least a reaction facility that generates hydrogen sulfide gas from sulfur and hydrogen gas, a plurality of cooling facilities that cool the generated hydrogen sulfide gas, and a sulfur recovery facility that recovers sulfur contained in the hydrogen sulfide gas.

In the production plant of each system, hydrogen sulfide gas generated in the reaction facility is cooled in the cooling facility, sulfur is recovered and removed in the sulfur recovery facility, and then the obtained hydrogen sulfide gas is supplied to a processing plant that uses hydrogen sulfide gas (hereinafter sometimes simply referred to as "processing plant").

In the prevent invention, the production plant of each system is provided with a first supply pipe that supplies the hydrogen sulfide gas from which sulfur has been recovered in the sulfur recovery facility to the processing plant that uses hydrogen sulfide gas, and a second supply pipe that is branched at a predetermined point in the first supply pipe and supplies the hydrogen sulfide gas from the sulfur recovery facility to the processing plant.

Further, the first supply pipe has a concentration meter that is provided on the sulfur recovery facility side of the predetermined branch point and measures the concentration of the hydrogen sulfide gas. In addition, the first supply pipe and the second supply pipe each have an ON/OFF valve that is provided on the processing plant side of the predetermined branch point and turns ON/OFF the supply of the hydrogen sulfide gas to the supply pipe.

Here, in the hydrogen sulfide gas production plant, at the time of predetermined regular inspection, in case of sudden trouble, or at the time of plant start-up, the hydrogen sulfide gas production plant and the processing plant are first isolated, and the inside of the hydrogen sulfide gas production plant is replaced with nitrogen gas or the like. When a production plant is suspended at the time of regular inspection or in case of trouble, because hydrogen sulfide gas that has been generated before the suspension remains inside, the concentration of the hydrogen sulfide gas decreases as a result of the drafting of nitrogen gas. In addition, also at the time of plant start-up, in the initial stage, because of the mixing with the nitrogen gas drafted inside, low-concentration hydrogen sulfide gas will be generated.

Conventionally, such low-concentration hydrogen sulfide gas has not been effectively utilized and has been a loss in hydrogen sulfide gas production as waste hydrogen sulfide gas. Then, because such low-concentration hydrogen sulfide gas cannot be discharged into the air as it is, it has been processed using a flaring facility, a harm elimination facility, or the like. However, this has created not a little load on the environment, and also it has been necessary to separately use a neutralizer, such as caustic soda.

Meanwhile, according to the hydrogen sulfide gas production plant system of the present invention and the method for recovering and using hydrogen sulfide gas using the plant system, the low-concentration hydrogen sulfide gas generated at the time of regular inspection or the like, or at the time of plant start-up can be efficiently recovered and effectively supplied to a processing plant that uses hydrogen sulfide gas. Further, because such effective utilization is possible, the conventional processing using a flaring facility or a harm elimination facility is not required, and the load on the environment can be effectively reduced. At the same time, a neutralizer such as caustic soda is not required, which is also advantageous in terms of cost.

Incidentally, as processing plants that use hydrogen sulfide gas, a dezincification process plant and a sulfurization process plant used in the dezincification process and the sulfurization process, respectively, of a hydrometallurgical method for a nickel oxide ore can be mentioned, for example.

The hydrometallurgical method for a nickel oxide ore is a hydrometallurgical method that recovers nickel and cobalt from a slurry of a nickel oxide ore using, for example, a high-temperature and high-pressure leaching process (HPAL process). Specifically, the hydrometallurgical method for a nickel oxide ore includes a leaching process in which sulfuric acid is added to a slurry of a nickel oxide ore, and leaching is performed at a high temperature and a high pressure, a solid-liquid separation process in which the leached slurry is washed in several stages obtains to separate the residue to give a leachate containing nickel, cobalt, and also impurity elements, a neutralization process in which the pH of the leachate is adjusted to separate the neutralization precipitate containing impurity elements to give a neutralization end solution containing nickel, cobalt, and also zinc, a dezincification process in which hydrogen sulfide gas is blown to the neutralization end solution to form and separate zinc sulfide to give a mother liquor for nickel recovery containing nickel and cobalt, and a sulfurization process in which hydrogen sulfide gas is blown to the mother liquor for nickel recovery to form a mixed sulfide containing nickel and cobalt.

In the dezincification process and the sulfurization process of the hydrometallurgical method for a nickel oxide ore, hydrogen sulfide gas is blown into the gas phase of the reaction tank of each plant to cause a sulfurization reaction, thereby forming metal sulfide. Accordingly, when low-concentration hydrogen sulfide gas, which has conventionally been disposed as waste hydrogen sulfide gas, is efficiently recovered and supplied to such a processing plant that uses hydrogen sulfide gas together with the hydrogen sulfide gas regularly produced from the hydrogen sulfide gas production plant, the hydrogen sulfide gas produced in the hydrogen sulfide gas production plant can be supplied without a loss. In addition, in each processing plant that uses hydrogen sulfide gas, the cost of using hydrogen sulfide gas can also be reduced, allowing for efficient hydrometallurgical operation.

Figure 4:
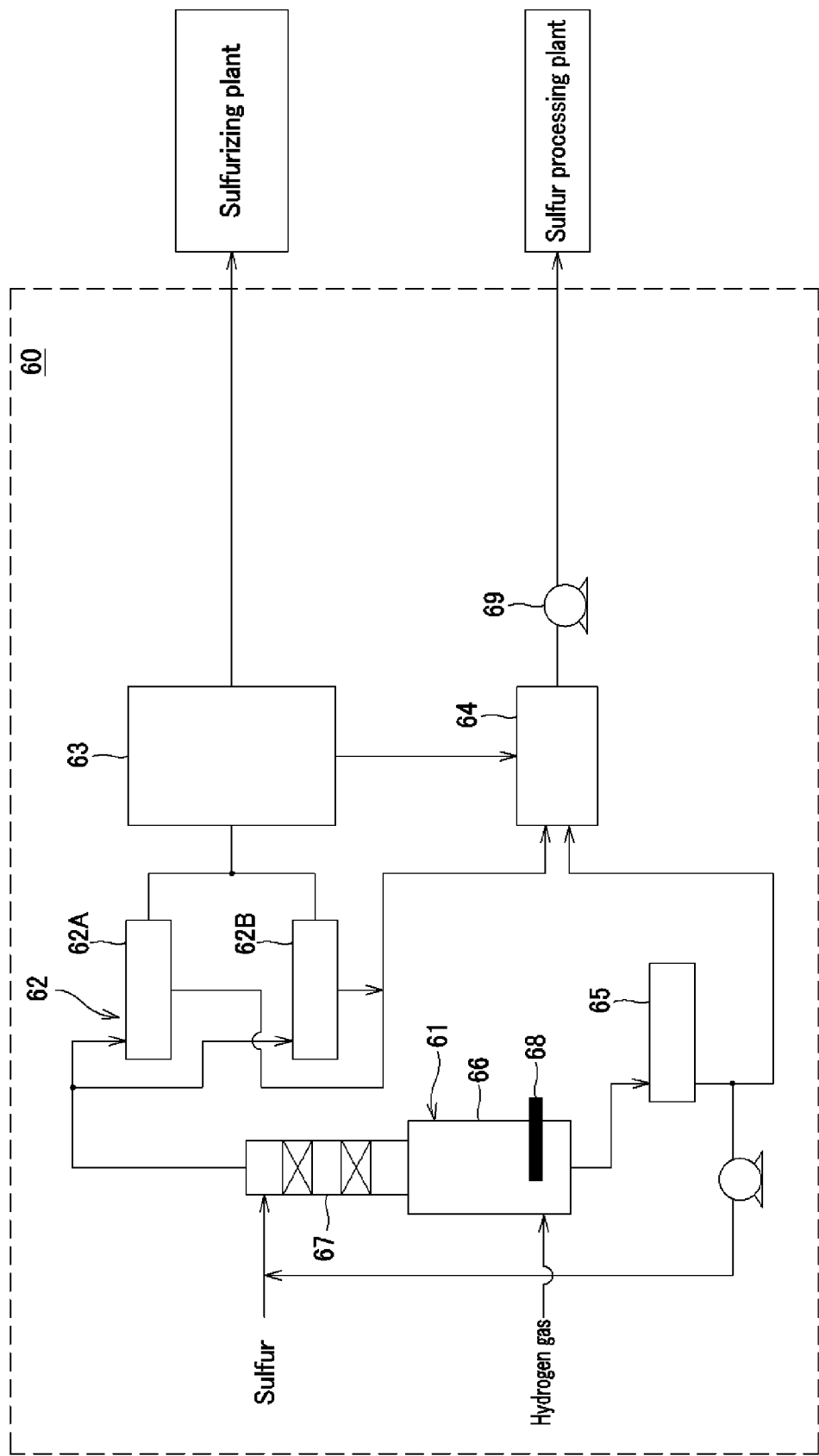
FIG. 4 is a schematic block diagram showing the configuration of a conventional hydrogen sulfide gas production plant.

Hereinafter, specific embodiments of the hydrogen sulfide gas production plant system and the method for recovering and using hydrogen sulfide gas according to the present invention will be described in further detail with reference to drawings. Incidentally, the hydrogen sulfide gas production plant of this embodiment is an improvement of the hydrogen sulfide gas production plant 60 shown in FIG. 4, and some common descriptions will be omitted.

[2. Hydrogen Sulfide Gas Production Plant System]

FIG. 1 schematically shows an example of the configuration of a hydrogen sulfide gas production plant system. The hydrogen sulfide gas production plant system 1 shown in FIG. 1 includes a plurality of hydrogen sulfide production plants described below. As described later in detail, production plants of different systems are connected through a supply pipe that supplies the generated hydrogen sulfide gas such that the hydrogen sulfide gas generated in each production plant is supplied to the same processing plant.

Incidentally, FIG. 1 shows, as an example, the hydrogen sulfide gas production plant system 1 that is made up of two systems of hydrogen sulfide gas production plants (production plant 10A, production plant 10B). However, the invention is not limited to two systems, and it is also possible to have three or more systems of production plants.

Hereinafter, the production plants forming the hydrogen sulfide gas production plant system 1 will be specifically described. Incidentally, the production plants all have the same configuration. Therefore, the same configuration in each production plant is indicated with the same reference numeral, and the production plant 10A is will be described as a representative.

<Hydrogen Sulfide Gas Production Plant>

The hydrogen sulfide gas production plant 10A is provided with a reaction facility 11A that generates hydrogen sulfide gas, a plurality of cooling facilities 12A that cool the generated hydrogen sulfide gas, and a sulfur recovery facility 13A that recovers sulfur in the hydrogen sulfide gas and supplies the hydrogen sulfide gas from which sulfur has been removed. The hydrogen sulfide gas production plant 10A also includes a first supply pipe 14A that supplies the hydrogen sulfide gas from which sulfur has been recovered in the sulfur recovery facility 13A to a processing plant X that uses hydrogen sulfide gas, and a second supply pipe 16A that is branched at a predetermined point 15A in the first supply pipe 14A and supplies the hydrogen sulfide gas from the sulfur recovery facility 13A to the processing plant X.

In addition, the hydrogen sulfide gas production plant 10A is also provided with a blowdown facility 17A that stores the sulfur recovered and removed in the sulfur recovery facility 13 and supplies the same to a plant that processes sulfur (sulfur processing plant) and a sulfur cooling facility 18A that cools the sulfur in order to adjust the heat balance in the reaction facility 11A.

(Reaction Facility)

The reaction facility 11A includes, for example, a reactor 19A, a quench tower 20A, and a heater 21A. The reaction facility 11A causes a hydrogen sulfide gas generation reaction by the supplied sulfur and hydrogen gas to generate hydrogen sulfide gas.

More specifically, in the reaction facility 11A, molten sulfur is stored in the reactor 19A, and hydrogen gas is supplied from the lower part thereof. As a result, the reaction proceeds while the upward flow of hydrogen gas passes through the molten sulfur, whereby hydrogen sulfide gas is generated. The hydrogen sulfide gas generated here is mostly hydrogen sulfide, but partially contains sulfur steam involved when the hydrogen gas passed through the reactor 19A.

In addition, in the reaction facility 11A, the operation is performed at relatively high-temperature and high-pressure conditions at a temperature of about 470° C. and a pressure of about 800 kPaG, and the generated hydrogen sulfide gas also has a high temperature and a high pressure. Incidentally, the hydrogen sulfide gas generated in the reaction facility 11A exchanges heat with supplied sulfur, and thus has a temperature of about 150° C. when passing through the quench tower 20A.

Here, from the lower part of the reactor 19A, hydrogen gas to react with molten sulfur is supplied as mentioned above. However, at the time of regular inspection, in case of trouble, at the time of plant start-up, nitrogen gas is supplied from the lower part of the reactor 19A. The supplied nitrogen gas passes through the inside of the reaction facility 11A, transfers to each of the constituent facilities such as the cooling facility 12A and the sulfur recovery facility 13A, and replaces the inside of the production plant 10A.

At this time, at the time of regular inspection or in case of trouble, because hydrogen sulfide gas is generated until right before the production plant suspension, hydrogen sulfide gas remains therein. Therefore, when nitrogen gas is supplied to the production plant 10A, the remaining hydrogen sulfide gas mixes with the nitrogen gas, producing low-concentration hydrogen sulfide gas. In addition, also at the time of plant start-up, hydrogen sulfide gas is gradually generated in the production plant 10A filled with the nitrogen gas. Therefore, in the early stage, low-concentration hydrogen sulfide gas will be present inside the production plant 10A.

In the hydrogen sulfide gas production plant system 1 of this embodiment, the low-concentration hydrogen sulfide gas thus generated can be efficiently recovered and effectively supplied to the processing plant X. The detail will be described below.

(Cooling Facility)

The cooling facility 12A recovers the hydrogen sulfide gas generated in the reaction facility 11A. The temperature for cooling the hydrogen sulfide gas in the cooling facility 12A is not particularly limited, but the lower the better in order to reduce the sulfur content in the hydrogen sulfide gas. Specifically, because (cooling) water is usually used, the gas is cooled to about 50° C.

In addition, the hydrogen sulfide gas production plant 10A is provided with a plurality of cooling facilities 12A (cooling facilities $12A_1, 12A_2, \ldots, 12A_n$). In the cooling facility 12A, some of sulfur contained in the recovered hydrogen sulfide gas solidifies and adheres to the inside of the facility (heat transfer surface). Therefore, a plurality of cooling facilities 12A are provided so that they can be switched and used alternately, thereby preventing a decrease in operation efficiency due to a decrease in cooling capacity. Incidentally, the hydrogen sulfide gas production plant 10 shown in FIG. 1 is an example having two systems, cooling facilities $12A_1$, $12A_2$.

Specifically, in the cooling facilities $12A_1$, $12A_2$, a jacket is provided around the lower part thereof, for example, making it possible to melt the adhering sulfur by heating with steam. For example, in the case where sulfur adheres to the cooling facility $12A_1$, the use of the cooling facility $12A_1$ is suspended and switched to the cooling facility $12A_2$. In the cooling facility $12A_1$ that is suspended from use, the adhering sulfur is melted with steam and recovered.

Here, even when the cooling facility $12A_1$, $12A_2$ is temporarily suspended from use, because hydrogen sulfide gas is cooled until right before the suspension, a high-pressure, high-concentration hydrogen sulfide gas is present inside. Therefore, for the processing to melt and recover the sulfur adhering to the inside, it is necessary to perform the processing after the hydrogen sulfide gas in the cooling facility $12A_1$, $12A_2$, from which sulfur is to be melted and recovered, is discharged to reduce the internal pressure. In the hydrogen sulfide gas production plant 10A, the hydrogen sulfide gas discharged at this time is generated from the cooling facility $12A_1$, $12A_2$ as waste hydrogen sulfide gas.

As a mode of discharge of waste hydrogen sulfide gas from the hydrogen sulfide gas production plant 10A, for example, the waste hydrogen sulfide gas is discharged to the below-described blowdown facility 17A together with the sulfur melted and recovered in the cooling facility $12A_1$, $12A_2$ to release the pressure, and the gas is discharged from the discharge port provided in the blowdown facility 17A. It is also possible that waste hydrogen sulfide gas generated in the cooling facility $12A_1$, $12A_2$ is directly discharged from the discharge port provided in the cooling facility $12A_1$, $12A_2$.

Incidentally, in the case where waste hydrogen sulfide gas is discharged from the discharge port provided in the blowdown facility 17A or the cooling facility $12A_1$, $12A_2$, it is possible to provide a pipe that connects the discharge ports of the facilities to the predetermined processing plant that uses hydrogen sulfide gas. As a result, the generated waste hydrogen sulfide gas can be effectively recovered through the pipe and supplied to the predetermined processing plant.

(Sulfur Recovery Facility)

The sulfur recovery facility (knockout facility) 13A recovers and removes the sulfur in the hydrogen sulfide gas cooled in the cooling facility $12A_1$, $12A_2$. Then, the sulfur recovery facility 13A supplies the hydrogen sulfide gas from which sulfur has been removed to the processing plant X that uses hydrogen sulfide gas.

As mentioned above, the hydrogen sulfide gas generated in the reaction facility 11A partially contains sulfur steam. In the sulfur recovery facility 13A, the sulfur steam is solidified and accumulated on the bottom, and sulfur is melted by heating with steam through a jacket installed on the lower outer periphery, for example, and thus recovered. The recovered sulfur is transferred to the blowdown facility 17A described below.

In addition, as the processing plant X that serves as the supply destination of the hydrogen sulfide gas supplied from the sulfur recovery facility 13A, as mentioned above, sulfurization plants used in a hydrometallurgical method for a nickel oxide ore, such as a sulfurization process plant and a dezincification process plant, can be mentioned.

(First Supply Pipe)

The first supply pipe 14A has one end connected to the sulfur recovery facility 13A and the other end connected to the processing plant X that uses hydrogen sulfide gas, and supplies the hydrogen sulfide gas, from which sulfur has been removed in the sulfur recovery facility 13A, to the processing plant X.

The first supply pipe 14A has a pipe connection point in the predetermined point 15A, where branching is possible, and the below-described second supply pipe 16A is connected at the pipe connection point.

In addition, in the first supply pipe 14A, on the upstream side than the predetermined point 15A used as a pipe connection point with the second supply pipe 16A, that is, on the sulfur recovery facility 13A side, a concentration meter 22A that measures the concentration of the hydrogen sulfide gas supplied through the first supply pipe 14A is provided. In addition, in the first supply pipe 14A, on the downstream side of the predetermined point 15A, that is, on the processing plant X side, an ON/OFF valve 23A that performs ON/OFF control of the supply of hydrogen sulfide gas to the processing plant through the first supply pipe 14A is provided.

In the hydrogen sulfide gas production plant system 1, the first supply pipe 14A of the production plant 10A and the first supply pipe 14B of the production plant 10B are connected at a predetermined point. The hydrogen sulfide gas produced in the production plant 10A and the hydrogen sulfide gas produced in 10B are mixed through each of the first supply pipes 14A, 14B and supplied to the processing plant X.

The first supply pipes 14A, 14B are connected to the processing plant X through a continuous supply pipe (hereinafter referred to as "supply pipe 14C" for convenience), and the hydrogen sulfide gas produced in each of the production plants 10A, 10B and mixed through each of the first supply pipes 14A, 14B is supplied to the processing plant X through the supply pipe 14C. In addition, the supply pipe 14C is provided with a control valve 24 that controls the amount of hydrogen sulfide gas to be supplied to the processing plant X, and also provided with a flow meter 25 that measures the flow rate of the hydrogen sulfide gas on the processing plant X side of the control valve 24. In the supply pipe 14C, the control valve 24 is adjusted according to the flow rate measured in the flow meter 25, whereby the amount of hydrogen sulfide gas to be supplied to the processing plant can be controlled.

(Second Supply Pipe)

As mentioned above, the second supply pipe 16A has one end connected to the predetermined point 15A that serves as a pipe connection point in the first supply pipe 14A. The second supply pipe 16A has the other end connected to the processing plant X that uses hydrogen sulfide gas, and supplies the hydrogen sulfide gas, from which sulfur has been removed in the sulfur recovery facility 13A, to the processing plant X.

In addition, the second supply pipe 16A is provided with an ON/OFF valve 26A that performs ON/OFF control of the supply of the hydrogen sulfide gas to the processing plant X through the second supply pipe 16A immediately after the connection point with the first supply pipe 14A.

This second supply pipe 16A is a so-called supply pipe for low-concentration hydrogen sulfide gas, which mainly recovers low-concentration hydrogen sulfide gas generated at the time of regular inspection or at the time of plant start-up and supplies the same to the processing plant X.

The processing plant X to which the first supply pipe 14A connects is the same processing plant as the processing plant X to which the second supply pipe 16A connects. Further, the low-concentration hydrogen sulfide gas generated at the time of regular inspection, at the time of start-up or the like, is recovered through the second supply pipe 16A, making it possible to effectively supply the low-concentration hydrogen sulfide gas, which has conventionally been disposed as waste hydrogen sulfide gas, to the processing plant X. As a result, the processing efficiency in the processing plant X can be prevented from decreasing due to a delay in the supply of hydrogen sulfide gas to the processing plant X. The detail will be described below.

In the hydrogen sulfide gas production plant system 1, the second supply pipe 16A of the production plant 10A and the second supply pipe 16B of the production plant 10B are connected at a predetermined point, and the low-concentration hydrogen sulfide gas generated in each of the production plants 10A, 10B is supplied to the processing plant X.

When the second supply pipe 16A of the production plant 10A is connected to the second supply pipe 16B of the production plant 10B, they are connected to the processing plant X through a supply pipe continuous thereto (hereinafter referred to as "supply pipe 16C" for convenience). This supply pipe 16C is provided with a pressure meter 27 that measures the pressure of the hydrogen sulfide gas supplied to the processing plant X and a flow meter 28 that measures the flow rate of the hydrogen sulfide gas. Further, the supply pipe 16C is provided with a control valve 29 that controls the supply of the hydrogen sulfide gas to the processing plant X.

Like this, the supply pipe 16C is provided with the pressure meter 27, the flow meter 28, and the control valve 29. Thus, the control valve 29 is controlled according to the pressure or flow rate of the hydrogen sulfide gas, whereby low-concentration hydrogen sulfide gas can be supplied to the processing plant X based on suitable supply control.

In addition, the supply pipe 16C is provided with at least one ON/OFF valve 30, allowing for the isolation of the low-concentration hydrogen sulfide gas between the hydrogen sulfide gas production plant 10 and the processing plant X in case of emergency.

In addition, the second supply pipe 16A may be provided with a control valve between the first supply pipe 14A and the ON/OFF valve 26A. As a result, in a production plant under normal operation, not only that all the produced hydrogen sulfide gas is transferred through the first supply pipe 14A, but also that by adjusting the control valve provided in the second supply pipe 16A, some of the produced hydrogen sulfide gas can also be recovered in the second supply pipe 16A.

For example, the low-concentration hydrogen sulfide gas generated in the production plant 10A is recovered through the second supply pipe 16A, and also some of high-concentration hydrogen sulfide gas produced in the production plant 10B under normal operation is adjusted with the control valve and recovered through the second supply pipe 16B. Further, the low-concentration hydrogen sulfide gas in the production plant 10A and the high-concentration hydrogen sulfide gas in the production plant 10B are mixed, whereby hydrogen sulfide gas having a finely adjusted concentration can be provided.

(Blowdown Facility)

The blowdown facility 17A recovers sulfur removed from the hydrogen sulfide gas in the sulfur recovery facility 13A. In addition, the blowdown facility 17A recovers sulfur adhering in the cooling facilities $12A_1$, $12A_2$. Further, the blowdown facility 17A supplies the recovered sulfur to a sulfur processing plant or the like, for example, by a supply pump 31A. Alternatively, it is also possible to recycle the recovered sulfur as a sulfur source to be supplied again to the reaction facility 11A.

In addition, the blowdown facility 17A may also be provided with a discharge port for discharging the waste hydrogen sulfide gas generated in the cooling facilities $12A_1$, $12A_2$ and discharged into the blowdown facility 17A out of the system. Then, it is possible that a pipe is connected to the discharge port so that the waste hydrogen sulfide gas is supplied to a predetermined processing plant through the pipe. As a result, waste hydrogen sulfide gas generated in the cooling facilities $12A_1$, $12A_2$ can also be effectively utilized.

(Sulfur Cooling Facility)

The sulfur cooling facility 18A cools sulfur from about 470° C. to about 150° C. in order to adjust the heat balance in the reaction facility 11A. In addition, the sulfur cooling facility 18A supplies the cooled sulfur to the blowdown facility 17A, for example, and supplies the same to a sulfur processing plant or the like, together with sulfur recovered from the cooling facilities $12A_1$, $12A_2$ and the sulfur recovery facility 13A. Alternatively, it is also possible to recycle the cooled sulfur as a sulfur source to be supplied again to the reaction facility 11A by a circulation pump 32A.

3. Method For Recovering And Using Hydrogen Sulfide Gas

Next, a method for recovering and using hydrogen sulfide gas generated in the hydrogen sulfide gas production plant system 1, particularly low-concentration hydrogen sulfide gas generated at the time of regular inspection, at the time of start-up or the like, will be described.

<Summary of Method for Recovering and Using Hydrogen Sulfide Gas>

As mentioned above, each of the hydrogen sulfide gas production plants 10A, 10B forming the hydrogen sulfide gas production plant system 1 is provided with a first supply pipe 14A, 14B for supply to the processing plant X that uses hydrogen sulfide gas and a second supply pipes 16A, 16B branched from the predetermined point 15A, 15B of the first supply pipe 14A, 14B. Further, the first supply pipe 14A, 14B is provided with a concentration meter 22A, 22B on the upstream side than the branch point 15A, 15B. In addition, the first supply pipe 14A, 14B and the second supply pipe 16A, 16B are provided with ON/OFF valves 23A, 23B and 26A, 26B that control the supply of the hydrogen sulfide gas through the pipes.

Here, in the hydrogen sulfide gas production plant system 1, at the time of predetermined regular inspection, in case of sudden trouble, or at the time of plant start-up, the hydrogen sulfide gas production plant is suspended, and the inside of the production plant is replaced with nitrogen gas or the like. Then, because hydrogen sulfide gas that has just generated remains in the production plant, the gas mixes with the drafted nitrogen gas, and low-concentration hydrogen sulfide gas concentration will be present. In addition, also at the time of plant start-up, in the initial stage, because of the mixing with the nitrogen gas drafted inside, low-concentration hydrogen sulfide gas will be generated.

In the case where such low-concentration hydrogen sulfide gas generated at the time of regular inspection or start-up is supplied to the processing plant X through a supply pipe as usual, the processing using the hydrogen sulfide gas in the processing plant X may be unstable, interfering with effective processing. In addition, in a hydrogen sulfide gas production plant system having a plurality of systems of production plants, the operation in the production plant that continues normal operation may also be made unstable.

Therefore, conventionally, such low-concentration hydrogen sulfide gas has been disposed as waste hydrogen sulfide gas. However, naturally, the amount of exhaust gas has been a production loss of hydrogen sulfide gas, and also the harm elimination processing has cost time and money. Further, in the hydrogen sulfide gas production plant system, it has been necessary to increase the load of normally operable production plants to the maximum so as to prevent the operation of the processing plant X, which is the supply destination of hydrogen sulfide gas, from being inefficient.

Thus, in this embodiment, in the case where any of the production plants forming the hydrogen sulfide gas production plant system 1 is suspended from operation based on regular inspection or the like, or at the time of the start-up of the plant, when low-concentration hydrogen sulfide gas is generated a result of the replacement with nitrogen gas, the low-concentration hydrogen sulfide gas is recovered through the second supply pipe in the production plant that is suspended from operation.

Then, the low-concentration hydrogen sulfide gas recovered through the second supply pipe and the hydrogen sulfide gas produced in the production plant that continues normal operation and recovered through the first supply pipe are supplied to the same predetermined processing plant X. At this time, the production load (operation load) in the production plant that continues normal operation is slightly increased so that a larger amount of hydrogen sulfide gas than in normal times is produced and supplied.

Incidentally, "production load (operation load)" refers to the production throughput in the hydrogen sulfide gas production plant, and "to increase the production load" means that more hydrogen sulfide gas than in normal times (than steady) is produced.

Here, as disclosed in Patent Literature 3, it has been known that in sulfurization in the sulfurization process of a hydrometallurgical method for a nickel oxide ore, for example, when the concentration of hydrogen sulfide gas supplied is 85% by volume or more, the input of nickel and cobalt is reduced to 30 to 35% by mass of the input in the steady state to efficiently cause a sulfurization reaction, whereby a sulfide of nickel and cobalt can be obtained with high yield.

Accordingly, in the hydrogen sulfide gas production plant system 1, the low-concentration hydrogen sulfide gas recovered and supplied from the production plant suspended from operation and the normal-concentration hydrogen sulfide gas supplied from the production plant under normal operation are mixed so that the weighted average of concentration is 85% by volume or more, for example. As a result, hydrogen sulfide gas including low-concentration hydrogen sulfide gas can be effectively supplied without a decrease in the operation efficiency in the processing plant X.

Incidentally, with respect to the weighted average of the concentration of the hydrogen sulfide gas supplied from the hydrogen sulfide gas production plant system 1, it is not limited to 85% by volume or more and may be suitably determined according to the kind of reaction in the processing plant X to which the gas is supplied or the like. Then, the increment of the load on the production plant under normal operation can be determined according to the weighted average of the concentration of the hydrogen sulfide gas to be supplied.

<Control Flow of Recovery and Use Method>

Figure 2:
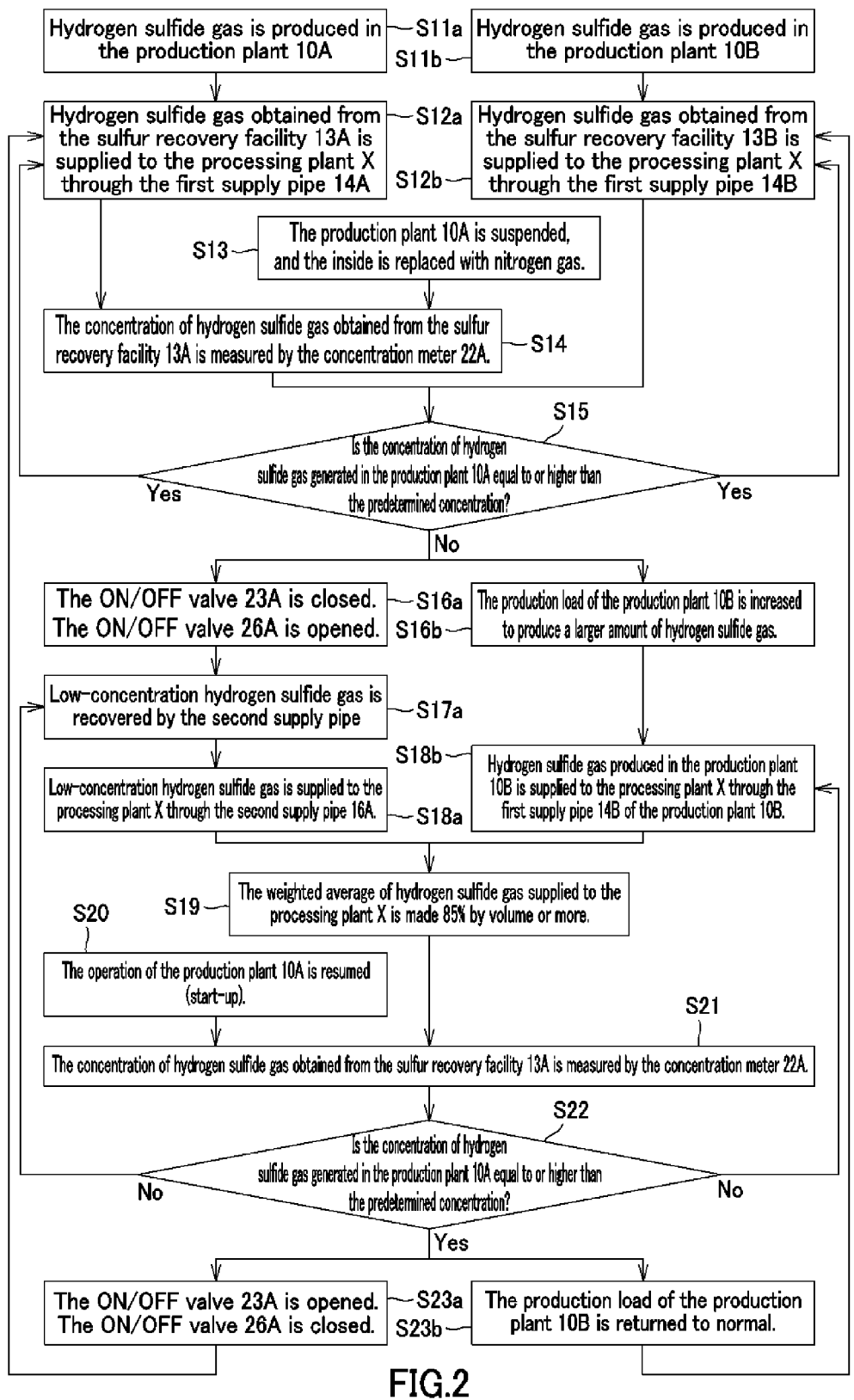
FIG. 2 is a control flow diagram in which low-concentration hydrogen sulfide gas generated at the time of regular inspection, at the time of plant start-up, or the like, is recovered and supplied to a processing plant, such as a sulfurizing plant.
Figure 3:
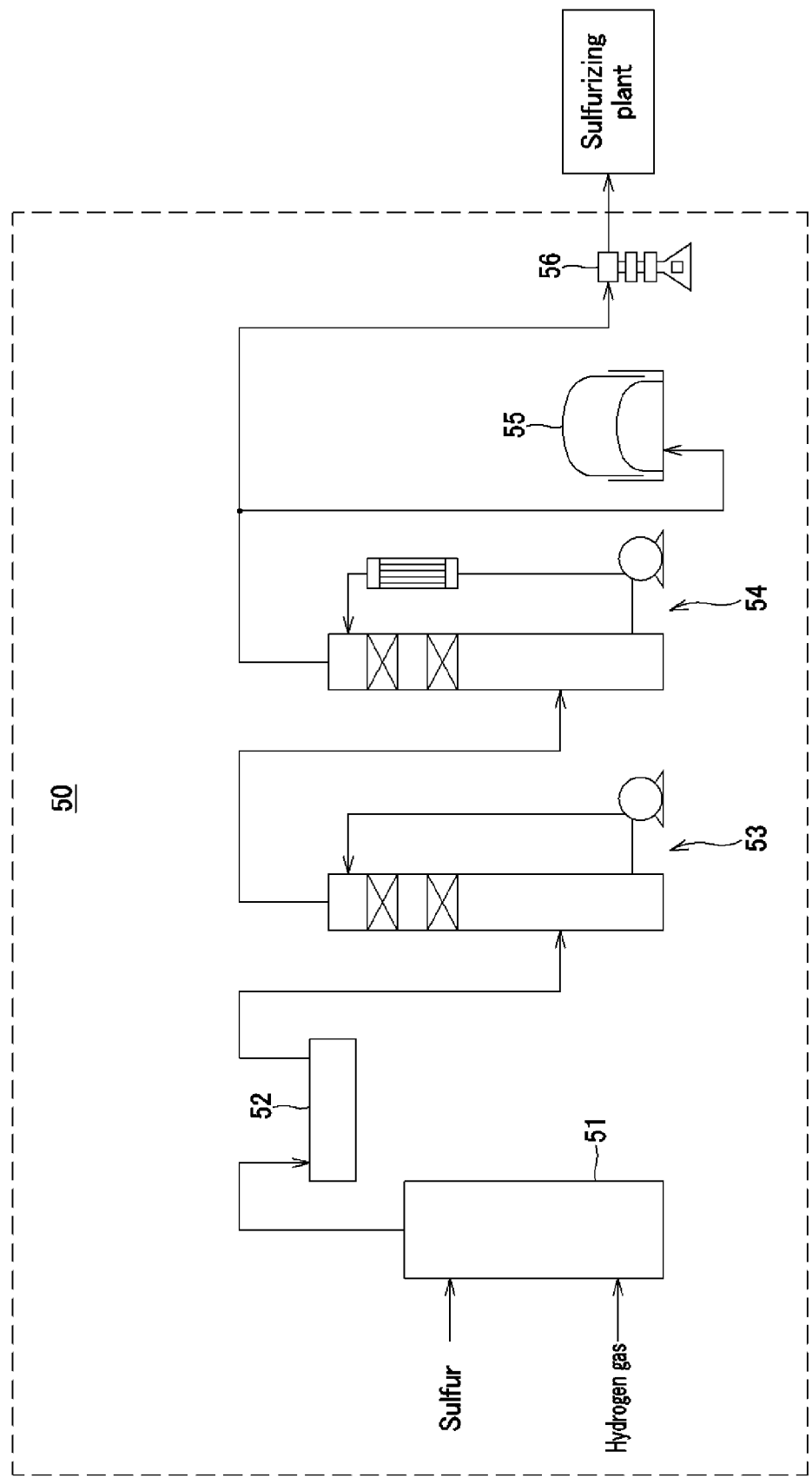
FIG. 3 is a schematic block diagram showing the configuration of a conventional hydrogen sulfide gas production plant.

FIG. 2 shows a control flow, in which low-concentration hydrogen sulfide gas generated at the time of regular inspection, at the time of plant start-up or the like, is recovered and supplied to the processing plant X, such as a sulfurizing plant. Hereinafter, the method for recovering and using hydrogen sulfide gas including low-concentration hydrogen sulfide gas will be described in more detail with reference to FIG. 2.

Incidentally, in the following description, explanations will be given taking, as an example, the case where in the hydrogen sulfide gas production plant system 1, the production plant 10A was suspended for a regular inspection or the like, whereby low-concentration hydrogen sulfide gas was generated in the production plant 10A.

First, at the time of the normal operation of the production plant 10A, when hydrogen sulfide gas is produced in the production plant 10A (Step S11a), hydrogen sulfide gas obtained from the sulfur recovery facility 13A is supplied to the processing plant X through the first supply pipe 14A (Step S12a).

Meanwhile, also in the production plant 10B that forms the hydrogen sulfide gas production plant system 1 together with the production plant 10A, when hydrogen sulfide gas is produced in the production plant 10B (Step S11b), hydrogen sulfide gas obtained from the sulfur recovery facility 13B is supplied to the same processing plant X through the first supply pipe 14B (Step S12b).

Like this, at the time of normal operation, the normal-concentration hydrogen sulfide gas produced in the production plant 10A and the production plant 10B is supplied to the same processing plant X through the first supply pipes 14A, 14B, respectively, and used for a sulfurization processing or the like in the processing plant X.

Therefore, at the time of normal operation, the operation load is almost equal to the production plants 10A and 10B.

Next, in the case where the production plant 10A is subjected to a regular facility inspection or in case of sudden trouble, for example, in Step S13, the operation of the production plant 10A is suspended, and nitrogen gas is supplied to the inside of the production plant 10A to perform a replacement treatment. When the replacement treatment is performed, the hydrogen sulfide gas that has been generated immediately before the suspension form operation and remaining inside the production plant 10A is diluted with nitrogen gas, resulting in the production of hydrogen sulfide gas having a concentration lower than a predetermined concentration inside the production plant 10A.

Thus, in the case where replacement with nitrogen gas is performed, the concentration of the hydrogen sulfide gas obtained from the sulfur recovery facility 13A is first measured by the concentration meter 22A in Step S14.

Next, in Step S15, it is judged whether the measured hydrogen sulfide gas concentration is equal to or higher than the predetermined concentration. That is, it is judged whether low-concentration hydrogen sulfide gas is flowing in.

In the case where it is judged that the concentration of hydrogen sulfide gas is equal to or higher than the predetermined concentration (in the case of Yes) in Step S15, the process in the production plant 10A returns to Step S12a, and the hydrogen sulfide gas is recovered through the first supply pipe 14A and supplied to the processing plant X. In addition, the process in the production plant 10B returns to Step S12b, and, as usual, the produced hydrogen sulfide gas is recovered through the first supply pipe 14B and supplied to the processing plant X.

Meanwhile, in the case where it is judged that the concentration of hydrogen sulfide gas is less than the predetermined concentration (in the case of No) in Step S15, low-concentration hydrogen sulfide gas has been generated in the production plant 10A due to replacement with nitrogen gas. Accordingly, the process in the production plant 10A goes to Step S16a, and the process in the production plant 10B goes to Step S16b.

In Step S16a, in the production plant 10A, the ON/OFF valve 23A provided in the first supply pipe 14A is closed, and the ON/OFF valve 26A provided in the second supply pipe 16A is opened.

Then, the process goes to Step S17a. The low-concentration hydrogen sulfide gas generated in the production plant 10A is recovered by the second supply pipe 16A, and then the recovered low-concentration hydrogen sulfide gas is supplied to the processing plant X through the second supply pipe 16A.

Meanwhile, in the production plant 10B, the production load of the production plant 10B is slightly increased in Step S16b. As a result, a larger amount of hydrogen sulfide gas than in the normal operation is produced.

Then, the process goes to Step S18b, and the hydrogen sulfide gas produced under the slightly increased production load is supplied to the processing plant X through the first supply pipe 14B. Incidentally, the increment of the production load at this time can be determined based on the weighted average of the concentration of the hydrogen sulfide gas supplied from the production plant 10A and the production plant 10B.

Like this, in the production plant 10A, low-concentration hydrogen sulfide gas is supplied to the processing plant X through the second supply pipe 16A, while in the production plant 10B, a larger amount of hydrogen sulfide gas than in the normal operation is produced and supplied to the processing plant X through the first supply pipe 14B.

At this time, in Step S19, the supply is made so that the weighted average of the concentration of the hydrogen sulfide gas supplied to the processing plant X from the production plant 10A and the production plant 10B is 85% by volume or more. This weighted average can be calculated from the hydrogen sulfide gas concentration and the hydrogen sulfide gas amount based on the low-concentration hydrogen sulfide gas from the production plant 10A and the normal-concentration hydrogen sulfide gas from the production plant 10B, and can be adjusted with the amount of nitrogen gas supplied for replacement. Incidentally, the amount of hydrogen sulfide gas or the like can be determined based on the value measured by the flow meter 28 that measures the flow rate of the hydrogen sulfide gas supplied from the supply pipe 16C in the hydrogen sulfide gas production plant system 1 shown in FIG. 1.

As mentioned above, in the case where low-concentration hydrogen sulfide gas is generated in the production plant 10A, the low-concentration hydrogen sulfide gas is recovered by the second supply pipe 16A and supplied to the processing plant X, while the production load of the production plant 10B under usual operation, which is not suspended from operation, is slightly increased, and a larger amount of hydrogen sulfide gas is produced and supplied to the processing plant X.

By such operation, the supply is controlled so that hydrogen sulfide gas having a weighted average concentration of 85% by volume or more is supplied to the processing plant X. As a result, low-concentration hydrogen sulfide gas, which has conventionally been disposed, can be effectively recovered and effectively supplied to the processing plant X. In addition, because no hydrogen sulfide gas is disposed, there is no production loss. It is also possible to eliminate the load on the environment accompanying the gas exhaustion processing, as well as the disposal processing and the cost therefor.

In addition, also in the processing plant X which is the supply destination of the hydrogen sulfide gas, an extreme drop in the supplied amount for every regular inspection on a production plant can be prevented, whereby the efficiency of processing, such as sulfurization processing, can be prevented from decreasing.

Now, back to the control flow of FIG. 2, when the regular inspection on the production plant 10A or the like is completed, in Step S20, the production plant 10A is started up to resume the operation.

In the early stage of start-up, hydrogen sulfide gas having sufficient concentration is not yet produced. For this reason, first, in Step S21, the concentration of the hydrogen sulfide gas produced in the production plant 10A and obtained from the sulfur recovery facility 13A is measured by the concentration meter 22A.

Next, in Step S22, it is judged whether the measured hydrogen sulfide gas concentration is equal to or higher than the predetermined concentration. That is, it is judged whether low-concentration hydrogen sulfide gas is still flowing in.

In the case where it is judged that the concentration of hydrogen sulfide gas is less than the predetermined concentration (in the case of No) in Step S22, hydrogen sulfide gas having a normal concentration has not yet been generated sufficiently. Therefore, the process in the production plant 10A returns to Step 517a, and the low-concentration hydrogen sulfide gas is recovered by the second supply pipe 16A and supplied to the processing plant X through the second supply pipe 16A in Step 518a. In addition, the process in the production plant 10B returns to Step 518b, and a larger amount of hydrogen sulfide gas produced under an increased load is recovered through the first supply pipe 14B and supplied to the processing plant X.

At this time, in Step S19, the amount of hydrogen gas supplied to the reaction facility 11A of the production plant 10A is adjusted so that the weighted average of the hydrogen sulfide concentration, which is calculated from the hydrogen sulfide gas concentration and the hydrogen sulfide gas amount based on the low-concentration hydrogen sulfide gas from the production plant 10A and the normal-concentration hydrogen sulfide gas from the production plant 10B, is 85% by volume or more.

Meanwhile, in the case where it is judged that the concentration of hydrogen sulfide gas is equal to or higher than the predetermined concentration (in the case of Yes) in Step S22, the process in the production plant 10A goes to Step S23a, while the process in the production plant 10B goes to Step S23b.

In Step S23a, in the production plant 10A, the ON/OFF valve 23A provided in the first supply pipe 14A is opened, and the ON/OFF valve 26A provided in the second supply pipe 16A is closed.

That is, the normal operation is resumed, and the hydrogen sulfide gas obtained from the sulfur recovery facility 13A is supplied to the processing plant X through the first supply pipe 14A (Step 512a).

Meanwhile, in the production plant 10B, the production load increased in Step S23b is returned to the usual load, and the hydrogen sulfide gas obtained from the sulfur recovery facility 13B is supplied to the processing plant X through the first supply pipe 14B (Step 512b).

As mentioned above, in the hydrogen sulfide gas production plant system 1, by performing the above control, the low-concentration hydrogen sulfide gas generated at the time of regular inspection or plant start-up or the like, can be effectively recovered, and the recovered hydrogen sulfide gas can be effectively supplied to the processing plant X.

EXAMPLES

[4. Examples]

Hereinafter, examples of the prevent invention will be described. However, the prevent invention is not limited to the following examples.

Example 1

As Example 1, the following operation was performed. Hydrogen sulfide gas was produced using the hydrogen sulfide gas production plant system 1 shown in FIG. 1 including two systems of hydrogen sulfide gas production plants 10A, 10B, and the hydrogen sulfide gas was supplied to a sulfurization process plant X that performs the sulfurization process of nickel oxide ore hydrometallurgy. In addition, in this operation, low-concentration hydrogen sulfide gas generated at the time of regular inspection on either of the production plants of two systems was recovered, and the recovered low-concentration hydrogen sulfide gas was supplied to the sulfurizing plant.

Specifically, as shown in FIG. 1, the hydrogen sulfide gas production plants 10A, 10B were provided with first supply pipes 14A, 14B that supply the hydrogen sulfide gas obtained from the sulfur recovery facilities 13A, 13B to the sulfurization process plant X, and also provided with second supply pipes 16A, 16B branched at predetermined points 15A, 15B of the first supply pipes 14A, 14B, respectively.

In addition, the first supply pipes 14A, 14B were provided with concentration meters 22A, 22B that measure the hydrogen sulfide gas concentration on the upstream side than the branch points 15A, 15B, respectively. Further, the first supply pipes 14A, 14B and the second supply pipes 16A, 16B were, on the downstream side of the branch points 15A, 15B, provided with ON/OFF valves 23A, 23B and 26A, 26B that control the supply of hydrogen sulfide gas to the sulfurization process plant X through each supply pipe, respectively.

In continuing the operation, one of the two systems of hydrogen sulfide gas production plants 10A, 10B was alternately subjected to regular inspection. At the time of inspection, the production plant to be inspected was suspended from operation, and replacement with nitrogen gas was performed. At this time, the low-concentration hydrogen sulfide gas generated as a result of the replacement with nitrogen gas was recovered through the second supply pipe in the production plant suspended from operation. Meanwhile, with respect to the production plant that was operated normally at that time, the production load was slightly increased to produce a larger amount of hydrogen sulfide gas.

Then, the amount of nitrogen gas was adjusted so as to ensure that the weighted average of the hydrogen sulfide gas concentration calculated from the hydrogen sulfide gas concentration and the hydrogen sulfide gas amount based on the recovered low-concentration hydrogen sulfide gas and the hydrogen sulfide gas produced in the normally operated production plant would be 85% by volume.

In addition, also at the time of start-up of the suspended hydrogen sulfide gas production plant, in the same manner, the low-concentration hydrogen sulfide gas generated from the hydrogen sulfide gas production plant replaced with nitrogen gas was recovered, and, together with the hydrogen sulfide gas produced from the normally operated production plant, the amount of hydrogen gas was adjusted so as to ensure that the weighted average of the hydrogen sulfide gas concentration calculated from the concentration and the gas amount would be 85% by volume.

Incidentally, with respect to the operating pressure conditions in the reaction facilities 11A, 11B of the hydrogen sulfide gas production plants 10A, 10B, although there were some variations, the daily average was 780 kPag. Meanwhile, the pressure condition in the sulfurizing plant X, which is the supply destination of hydrogen sulfide gas, was 280 kPag, and the pressure condition in the dezincification sulfurizing plant was 2 kPag.

The hydrogen sulfide gas production plant system 1 having the above configuration was operated for 6 months.

As a result of the operation, in the 6-month operation period, the number of production plant start-ups and shut-downs for regular inspection on the hydrogen sulfide gas production plants 10A, 10B was 10 in total. The amount of low-concentration hydrogen sulfide gas generated at that time was 3.1 t in total, and it was recoverable through the second supply pipes 16A, 16B. Thus, effective supply to the sulfurizing plant X, including the low-concentration hydrogen sulfide gas, was possible.

At the same time, because the low-concentration hydrogen sulfide gas as much as about 3.1 t could be recovered and supplied without making a production loss, it was possible to save about 3.0 t of sulfur and about 0.3 t of hydrogen gas (methanol) as raw-material-type operation materials corresponding to the production of 3.1 t of the hydrogen sulfide gas. In addition, as a disposal-type material that has conventionally been used in order to dispose the low-concentration hydrogen sulfide gas, about 4.3 t of caustic soda to absorb hydrogen sulfide gas for harm elimination became unnecessary. Incidentally, the conventional treatment in which the waste hydrogen sulfide gas is subjected to harm elimination in a flaring facility and then discharged to the air also became unnecessary, and thus there was no load on the environment.

Comparative Example 1

In the Comparative Example 1, the operation was performed using a conventional hydrogen sulfide gas production plant.

As a result, about 3.1 t of low-concentration hydrogen sulfide gas generated in a cooling facility was not recovered, and, as waste hydrogen sulfide gas, disposal in a harm elimination facility was necessary. Further, for the treatment in the harm elimination facility, about 4.3 t of caustic soda to absorb the hydrogen sulfide gas for harm elimination was necessary. In addition, in order to compensate for the production loss (recovery loss), as compared with Example 1, about 3.0 t of sulfur and about 0.3 t of hydrogen were additionally necessary as raw-material-type operation materials.

In addition, even in the case where hydrogen sulfide gas was processed in a flaring facility, there was a possibility that the generated sulfur oxide (SOx) would be discharged to the air.

Further, at the time of shut-down of the hydrogen sulfide gas production plant, it was necessary to perform replacement with nitrogen gas after temporary suspension. Therefore, also in the production plants of other systems that were normally operated, it was necessary to suspend the supply of hydrogen sulfide gas for about 10 days (about 1 day per suspension). As a result, it was also necessary to suspend the series of processes of the nickel oxide ore hydrometallurgy including the leach process, and, because of the start-up and shut-down of the production plant, the amount of production was significantly reduced by 1,000 Ni-t.

REFERENCE SIGNS LIST

1: Hydrogen sulfide gas production plant system,
10A, 10B: Hydrogen sulfide gas production plant,
11A, 11B: Reaction facility,
12, 12A, 12B: Cooling facility,
13A, 13B: Sulfur recovery facility,
14A, 14B: First supply pipe,
15A, 15B: Branch point,
16A, 16B: Second supply pipe,
17A, 17B: Blowdown facility,
18A, 18B: Sulfur cooling facility,
19A, 19B: Reactor,
20A, 20B; Quench tower,
21A, 21B: Heater,
22A, 22B: Concentration meter,
23A, 23B: ON/OFF valve,
24: Control valve,
25: Pressure meter,
26A, 26B: ON/OFF valve,
27: Pressure meter,
28: Flow meter,
29: Control valve,
30: ON/OFF valve,
31A, 31B: Supply pump,
32A, 32B: Circulation pump

The invention claimed is:

1. A hydrogen sulfide gas production plant system, comprising:
a plurality of systems of hydrogen sulfide gas production plants provided with at least a reaction facility that generates hydrogen sulfide gas from sulfur and hydrogen gas, a plurality of cooling facilities that cool the generated hydrogen sulfide gas, and a sulfur recovery facility that recovers sulfur contained in the hydrogen sulfide gas,
the hydrogen sulfide gas production plant system that:
the hydrogen sulfide gas production plant of each system is provided with
a first supply pipe that supplies the hydrogen sulfide gas from which sulfur has been recovered in the sulfur recovery facility to a processing plant that uses hydrogen sulfide gas, and
a second supply pipe that is branched at a predetermined point in the first supply pipe and supplies the hydrogen sulfide gas from the sulfur recovery facility to the processing plant;
the first supply pipe has a concentration meter that is provided on the sulfur recovery facility side than the predetermined branch point and measures the concentration of the hydrogen sulfide gas; and the first supply pipe and the second supply pipe each have an ON/OFF valve that is provided on the processing plant side than the predetermined branch point and turns ON/OFF the supply of the hydrogen sulfide gas to the processing plant through the supply pipe.

2. The hydrogen sulfide gas production plant system according to claim 1, the production plant of each system is connected to the production plant of another system through each of the first supply pipe and the second supply pipe.

3. The hydrogen sulfide gas production plant system according to claim 1, when any of the plurality of production plants is suspended from operation, in the case where hydrogen sulfide gas having a lower concentration than in normal times is generated, in the production plant suspended from operation, the ON/OFF valve provided in the first supply pipe is closed, while the ON/OFF valve provided in the second supply pipe is opened, whereby the hydrogen sulfide gas having a lower concentration is recovered through the second supply pipe.

4. The hydrogen sulfide gas production plant system according to claim 1, the processing plant is a dezincification process plant that forms zinc sulfide or a sulfurization process plant that forms a mixed sulfide of nickel and cobalt in a hydrometallurgical method for a nickel oxide ore.

5. A method for recovering and using hydrogen sulfide gas in a hydrogen sulfide gas production plant system, comprising:

wherein the systems of hydrogen sulfide gas production plants provided with at least a reaction facility that generates hydrogen sulfide gas from sulfur and hydrogen gas, a plurality of cooling facilities that cool the generated hydrogen sulfide gas, and a sulfur recovery facility that recovers sulfur contained in the hydrogen sulfide gas, the hydrogen sulfide gas production plant of each system is provided with a first supply pipe that supplies the hydrogen sulfide gas from which sulfur has been recovered in the sulfur recovery facility to a processing plant that uses hydrogen sulfide gas, and a second supply pipe that is branched at a predetermined point in the first supply pipe and supplies the hydrogen sulfide gas from the sulfur recovery facility to the processing plant;

the first supply pipe has a concentration meter that is provided on the sulfur recovery facility side than the predetermined branch point and measures the concentration of the hydrogen sulfide gas;

the first supply pipe and the second supply pipe each have an ON/OFF valve that is provided on the processing plant side than the predetermined branch point and turns ON/OFF the supply of the hydrogen sulfide gas to the processing plant through the supply pipe; and when any of the plurality of production plants is suspended from operation, in the case where hydrogen sulfide gas having a lower concentration than in normal times is generated, in the production plant suspended from operation, the hydrogen sulfide gas having a lower concentration is recovered through the second supply pipe and supplied to the processing plant, while in the production plants of other systems, hydrogen sulfide gas produced under an increased production load is supplied to the processing plant through the first supply pipe.

6. The method for recovering and using hydrogen sulfide gas according to claim 5, in the production plant suspended from operation, the ON/OFF valve provided in the first supply pipe is closed, while the ON/OFF valve provided in the second supply pipe is opened, whereby the hydrogen sulfide gas having a lower concentration is recovered through the second supply pipe.

7. The method for recovering and using hydrogen sulfide gas according to claim 5, the production plant of each system is connected to the production plant of another system through each of the first supply pipe and the second supply pipe.

8. The method for recovering and using hydrogen sulfide gas according to claim 5, the processing plant is a dezincification process plant that forms zinc sulfide or a sulfurization process plant that forms a mixed sulfide of nickel and cobalt in a hydrometallurgical method for a nickel oxide ore.

* * * * *